(12) United States Patent
Chiang

(10) Patent No.: US 10,014,127 B2
(45) Date of Patent: Jul. 3, 2018

(54) SAFETY LOCK MECHANISM FOR TRIGGER SWITCH HANDLE OF MITER SAW

(71) Applicant: Lowe's Companies, Inc., Mooresville, NC (US)

(72) Inventor: Hung Jung Chiang, Taichung (TW)

(73) Assignee: LOWE'S COMPANIES, INC., Mooresville, NC (US)

( * ) Notice: Subject to any disclaimer, the term of this patent is extended or adjusted under 35 U.S.C. 154(b) by 0 days.

(21) Appl. No.: 15/293,338

(22) Filed: Oct. 14, 2016

(65) Prior Publication Data

US 2017/0110266 A1    Apr. 20, 2017

(30) Foreign Application Priority Data

Oct. 16, 2015  (TW) .............................. 104133954 A

(51) Int. Cl.
| | |
|---|---|
| *H01H 3/20* | (2006.01) |
| *H01H 9/06* | (2006.01) |
| *B23D 59/00* | (2006.01) |
| *B23D 47/00* | (2006.01) |
| *B23Q 11/06* | (2006.01) |
| *B23D 45/04* | (2006.01) |

(52) U.S. Cl.
CPC ............... *H01H 9/06* (2013.01); *B23D 47/00* (2013.01); *B23D 59/001* (2013.01); *B23Q 11/06* (2013.01); *B23D 45/048* (2013.01); *H01H 3/20* (2013.01)

(58) Field of Classification Search
CPC ................................................ H01H 9/06–3/20
USPC ....... 200/43.11, 43.13, 522, 523, 318, 43.16, 200/43.17, 43.21
See application file for complete search history.

(56) References Cited

U.S. PATENT DOCUMENTS 4,879,438 A * 11/1989 Winchester .............. H01H 9/06
200/505

FOREIGN PATENT DOCUMENTS

| TW | 435289 U | 5/2001 |
| TW | 535674 U | 6/2003 |
| TW | 201325776 A | 7/2013 |

* cited by examiner

*Primary Examiner* — Vanessa Girardi
(74) *Attorney, Agent, or Firm* — Kilpatrick Townsend & Stockton LLP

(57) ABSTRACT

A safety lock mechanism mounted at a trigger switch handle of a miter saw to face toward a switch which includes a switch button pivotally mounted at the trigger switch handle to face toward the switch, and a safety lock connected to the switch button and providing an engaging portion and movable between a locking position where the engaging portion engages into the trigger switch handle to lock the switch button to the trigger switch handle and an unlocking position where the engaging portion is disengaged from the trigger switch handle for allowing the switch button to be moved relative to the trigger switch handle to trigger the switch. Thus, the arrangement of the safety lock prevents the user from accidentally forcing the switch button to trigger the switch, enhancing the operational safety of the miter saw.

16 Claims, 7 Drawing Sheets

SAFETY LOCK MECHANISM FOR TRIGGER SWITCH HANDLE OF MITER SAW

BACKGROUND OF THE INVENTION

1. Field of the Invention

The present invention relates to power switch technology and more particularly, to a safety lock mechanism for use in a trigger switch incorporated handle of a miter saw.

2. Description of the Related Art

A conventional miter saw (Taiwan Patent Publication No. 201325776) is known comprising: a base, a worktable rotatable relative to the base, a saw unit connected to one side of the worktable, and a positioning unit. The saw unit includes a saw arm pivotally connected to the worktable, a saw blade mounted at the saw arm, a motor mounted at the saw arm and adapted for rotating the saw blade, and an operating handle connected to the motor.

For the sake of safety and ease of operation, certain miter saws have a trigger mounted at the operating handle for controlling the power switch (see Taiwan Patent Publication No. 535674). When going to perform a cutting operation, the user can press the trigger at the operating handle to switch on the power supply of the motor, thereby starting the motor to rotate the saw blade. At this time, the user can move the saw blade downward toward the worktable to cut the workpiece.

These miter saws do not have any safety designs to prevent the trigger from being triggered accidentally. A user who is not very familiar with the operation mode can press the trigger accidentally, causing great danger by starting the rotation of the saw blade and cutting action.

In order to avoid the risk of the aforesaid danger, some other designs provide a power switch at the operating handle beyond the finger grip area for switching on the motor. However, the mounting position of the power switch is not conducive to a left-handed user. An improvement in this regard is desired.

SUMMARY OF THE INVENTION

The present invention has been developed in view of such prior art designs. It is one of the main objects of the present invention to provide a safety lock mechanism, which has a simple structure, facilitates operation and avoids the risk of operational errors.

To achieve this and other objects of the present invention, a safety lock mechanism is mounted at a trigger switch handle to face toward a switch, comprising a switch button and a safety lock. The switch button is pivotally mounted at the trigger switch handle to face toward the switch, e.g., so that the switch button is able to be engaged with the switch. The safety lock comprises an engaging portion. Further, the safety lock is connected to the switch button and movable between a locking position where the engaging portion engages with the trigger switch handle to lock the switch button to the trigger switch handle, and an unlocking position where the engaging portion is disengaged from the trigger switch handle to allow the switch button to be moved relative to the trigger switch handle to trigger the switch.

The invention has at least the following effects: The movable arrangement of the safety lock between the locking position and the unlocking position prevents the user from accidentally forcing the switch button to trigger the switch, enhancing the operational safety of the miter saw; the overall structure of the safety lock mechanism is quite simple, facilitating operation.

Other and further advantages and features of the present invention will be understood by reference to the following specification in conjunction with the accompanying drawings.

DETAILED DESCRIPTION OF THE INVENTION

Figure 1:
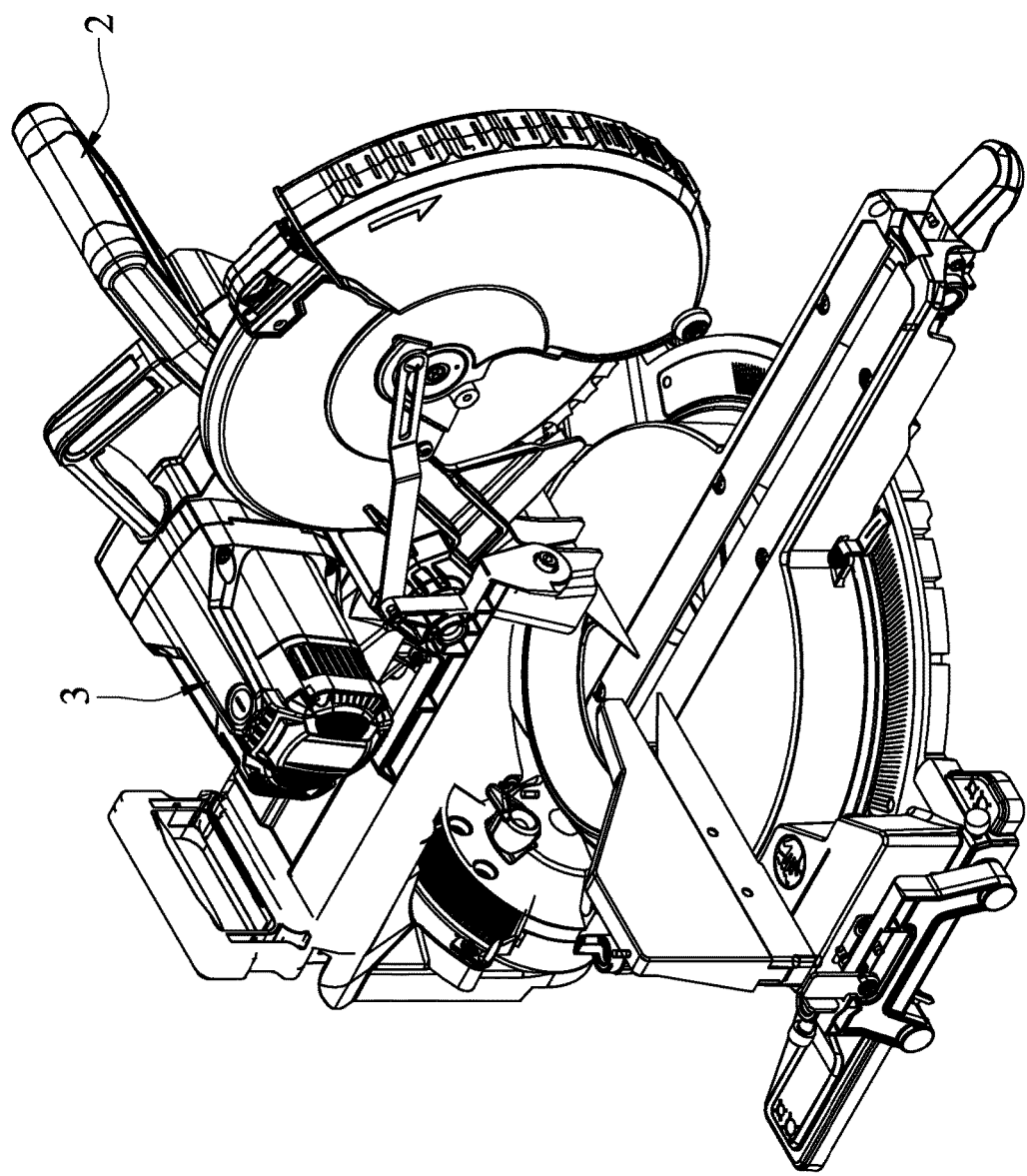
FIG. 1 is an oblique top elevational view, illustrating a safety lock mechanism installed in a miter saw's trigger switch incorporated handle in accordance with the present invention.
Figure 2:
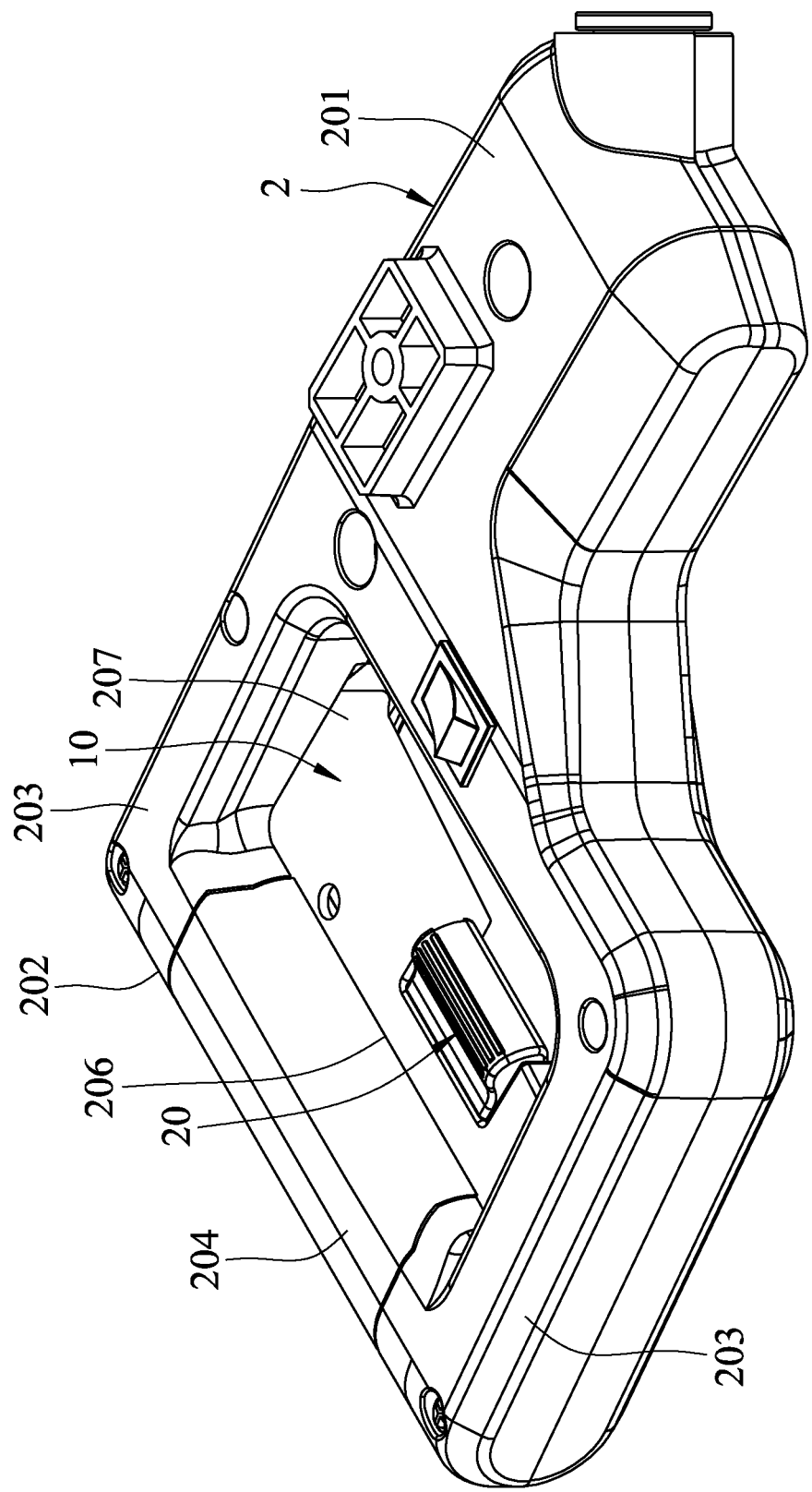
FIG. 2 is an elevational view, in an enlarged scale, of the trigger switch incorporated handle shown in FIG. 1.

Referring to FIGS. 1 and 2, a safety lock mechanism in accordance with the present invention is shown installed on a trigger switch incorporated handle 2 corresponding to a switch 1. The trigger switch incorporated handle 2 is installed in a saw unit 3 of a miter saw. The safety lock mechanism comprises a switch button 10, a safety lock 20, an elastic member 30, and a return spring 40.

In the present preferred embodiment, the trigger switch incorporated handle 2 is the operating handle of the saw unit 3, comprising a connection portion 201 connected to the saw unit 3 and a grip portion 202 connected to one side of the connection portion 201 opposite to the saw unit 3. The grip portion 202 comprises two opposing sidebars 203 connected to the connection portion 201 and a transverse bar 204 connected between the sidebars 203. The transverse bar 204 defines an end surface 205 and a sliding groove 206. The sliding groove 206 is located on the end surface 205 and extended to an inner side of the transverse bar 204. The connection portion 201, the sidebars 203 and the transverse bar 204 surround an opening 207 that is disposed in communication with the sliding groove 206. Further, a pivot rod 208 is located at the connection area between the sidebars 203 and the transverse bar 204. The switch 1 is mounted in the transverse bar 204 inside the sliding groove 206, comprising a triggering portion 101 that faces toward the open side of the sliding groove 206.

The switch button 10 is shaped like a rectangular block and pivotally mounted in the sliding groove 206 of the trigger switch incorporated handle 2 to face toward the switch 1, comprising a top surface 11 disposed adjacent to the opening 207, a bottom surface 12 disposed opposite to the top surface 11 to face toward the switch 1, two opposing lateral surfaces 131,132 connected to the top surface 11 and the bottom surface 12, a notch 14 extended from the top surface 11 to the bottom surface 12 and abutted to the two opposing lateral surfaces 131,132, a pin hole 15 facing toward the notch 14, a trigger block 16 protruded from the bottom surface 12, and a pivot-connection portion 17 located at one end of the bottom surface 12 and pivotally coupled to the pivot rod 208. The notch 14 comprises a shallow side 141 extended from the top surface 11 toward the bottom surface 12 and cut through one lateral surface 131, and a deep side 142 extended from the top surface 11 toward the bottom surface 12 and cut through the other lateral surface 132. The switch button 10 further comprises a protruding rod 18 facing toward the deep side 142 (see FIG. 5).

The safety lock 20 is pivotally connected to the switch button 10 and disposed in the notch 14, comprising an engaging portion 21 suspended or mounted in the deep side 142, an operating portion 22 disposed opposite the engaging portion 21 and mounted in the shallow side 141, a pivot hole 23 disposed between the operating portion 22 and the engaging portion 21, an axle pin 24 inserted through the pivot hole 23 and fastened to the pin hole 15, a plurality of anti-slip stripes 25 arranged on the operating portion 22, and a retaining groove 26 located on the engaging portion 21 to face toward the protruding rod 18.

In the present preferred embodiment, the elastic member 30 is a compression spring mounted between the switch button 10 and the safety lock 20 with two opposing ends thereof respectively attached to the protruding rod 18 and the retaining groove 26. The elastic restoring force of the elastic member 30 forces the safety lock 20 to bias the engaging portion 21 thereof toward a locking position (see FIG. 5).

In the present preferred embodiment, the return spring 40 is a compression spring mounted between the switch button 10 and the trigger switch handle 2. The elastic restoring force of the return spring 40 forces the switch button 10 and the safety lock 20 to bias toward the outside of the sliding groove 206, keeping the engaging portion 21 of the safety lock 20 out of the sliding groove 206.

Figure 5:
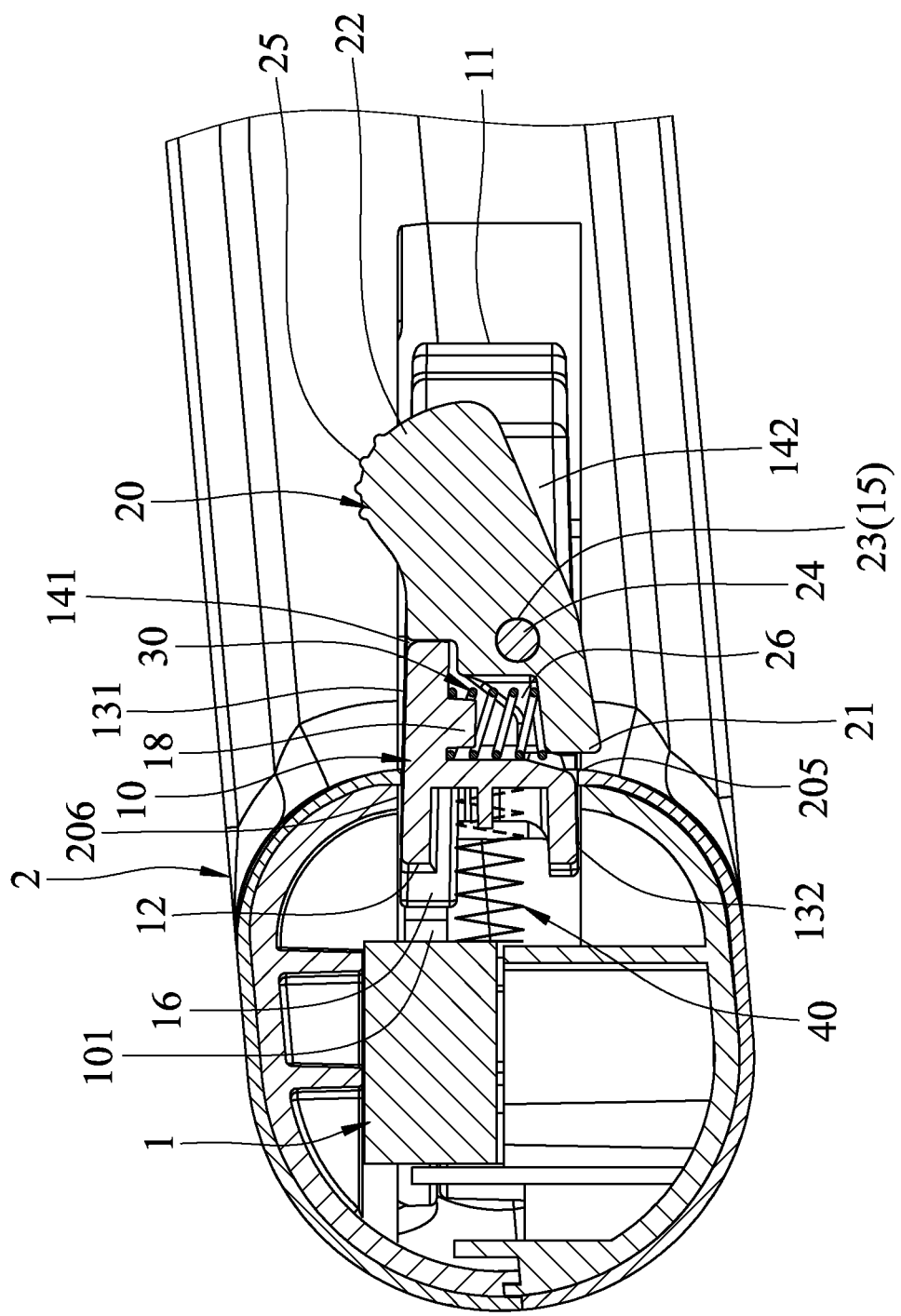
FIG. 5 is a sectional view taken along line V-V of FIG. 4, illustrating the safety lock set in the locking position in the trigger switch incorporated handle.

Further, FIG. 5 illustrates the safety lock 20 forced by the elastic restoring force of the elastic member 30 to hold the engaging portion 21 thereof in the locking position where the engaging portion 21 extends out of the deep side 142 of the notch 14 and held in position relative to the end surface 205 of the trigger switch handle 2. If the user presses the top surface 11 of the switch button 10 at this time, the engaging portion 21 keeps its position on the end surface 205 of the trigger switch handle 2 to prohibit the trigger block 16 from triggering the triggering portion 101 of the switch 1.

Figure 6:
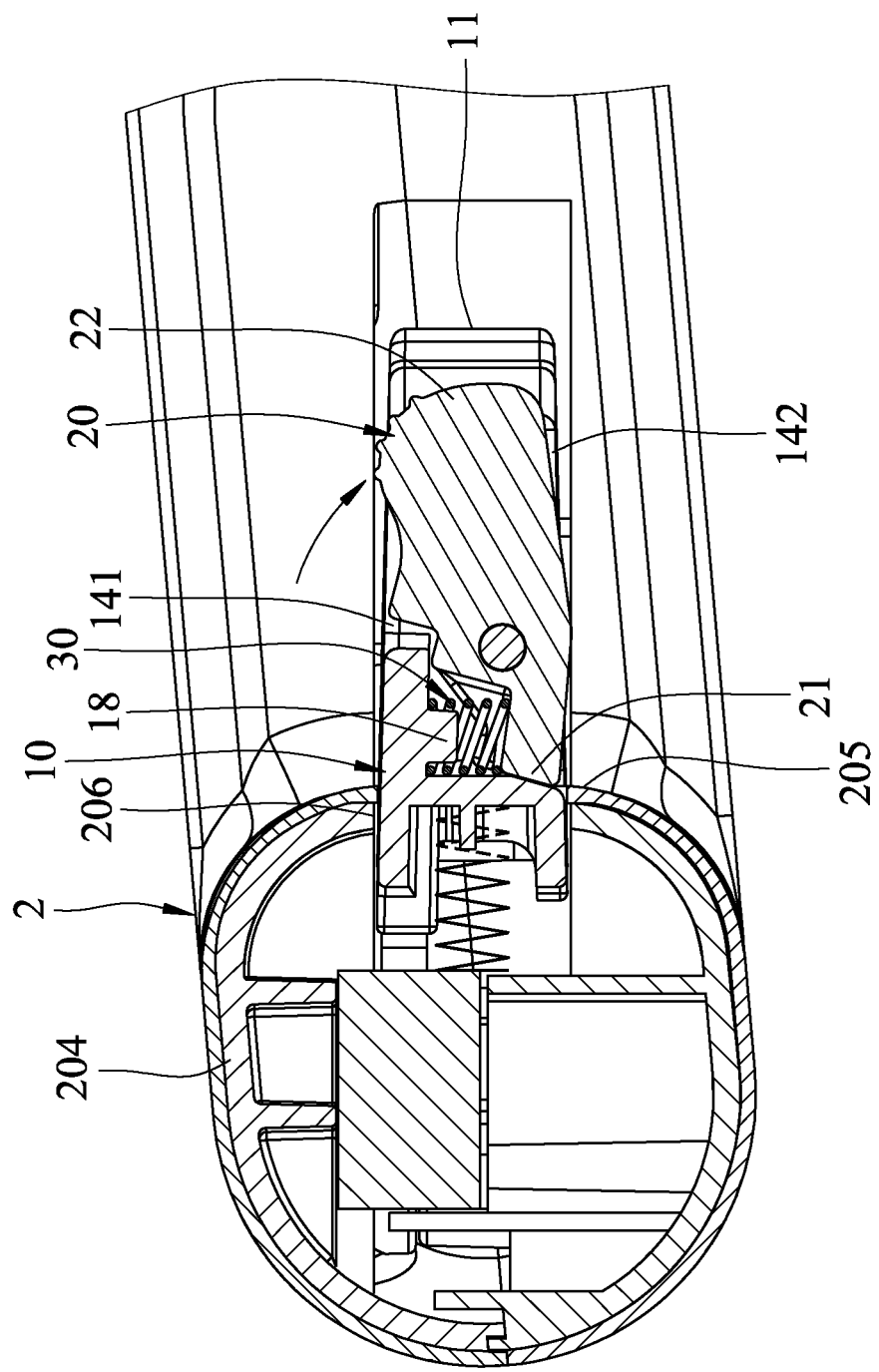
FIG. 6 is a schematic operational view of the present invention, illustrating the safety lock moved to the unlocking position.

Further, as illustrated in FIG. 6, when the user is going to start a cutting operation and holds the trigger switching handle 2 by hand, the user can press the operating portion 22 of the safety lock 20 with the hand that holds the transverse bar 204, which moves the operating portion 22 from the shallow side 141 toward the deep side 142. At this time, the engaging portion 21 is moved toward the protruding rod 18 to an unlocking position (at this time, the elastic member 30 is compressed to preserve an elastic potential energy). When the unlocking position is reached, the engaging portion 21 is moved away from the end surface 205 to release the trigger switch handle 2 from the constraint of such movement.

Figure 3:
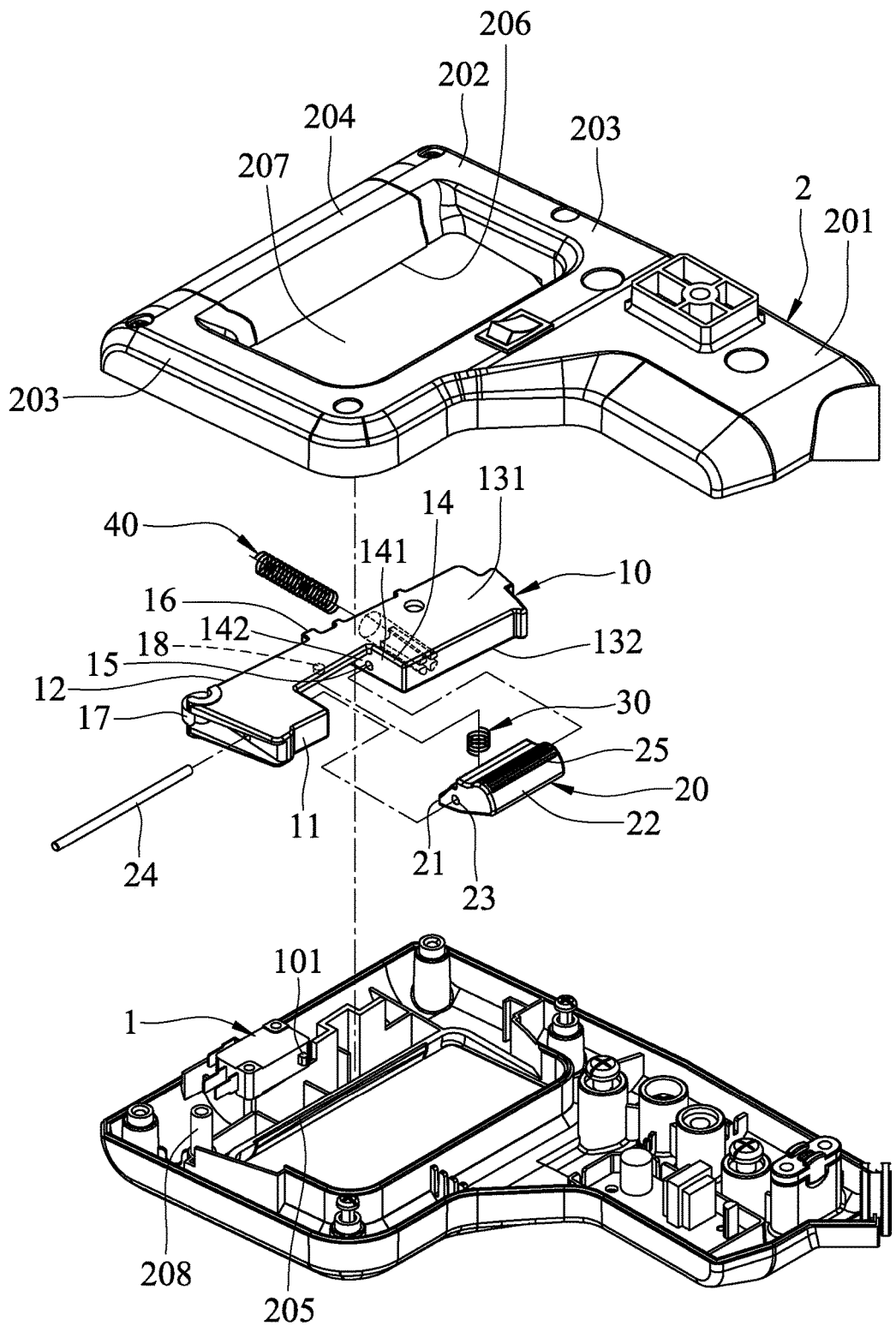
FIG. 3 is an exploded view of the trigger switch incorporated handle shown in FIG. 2.
Figure 4:
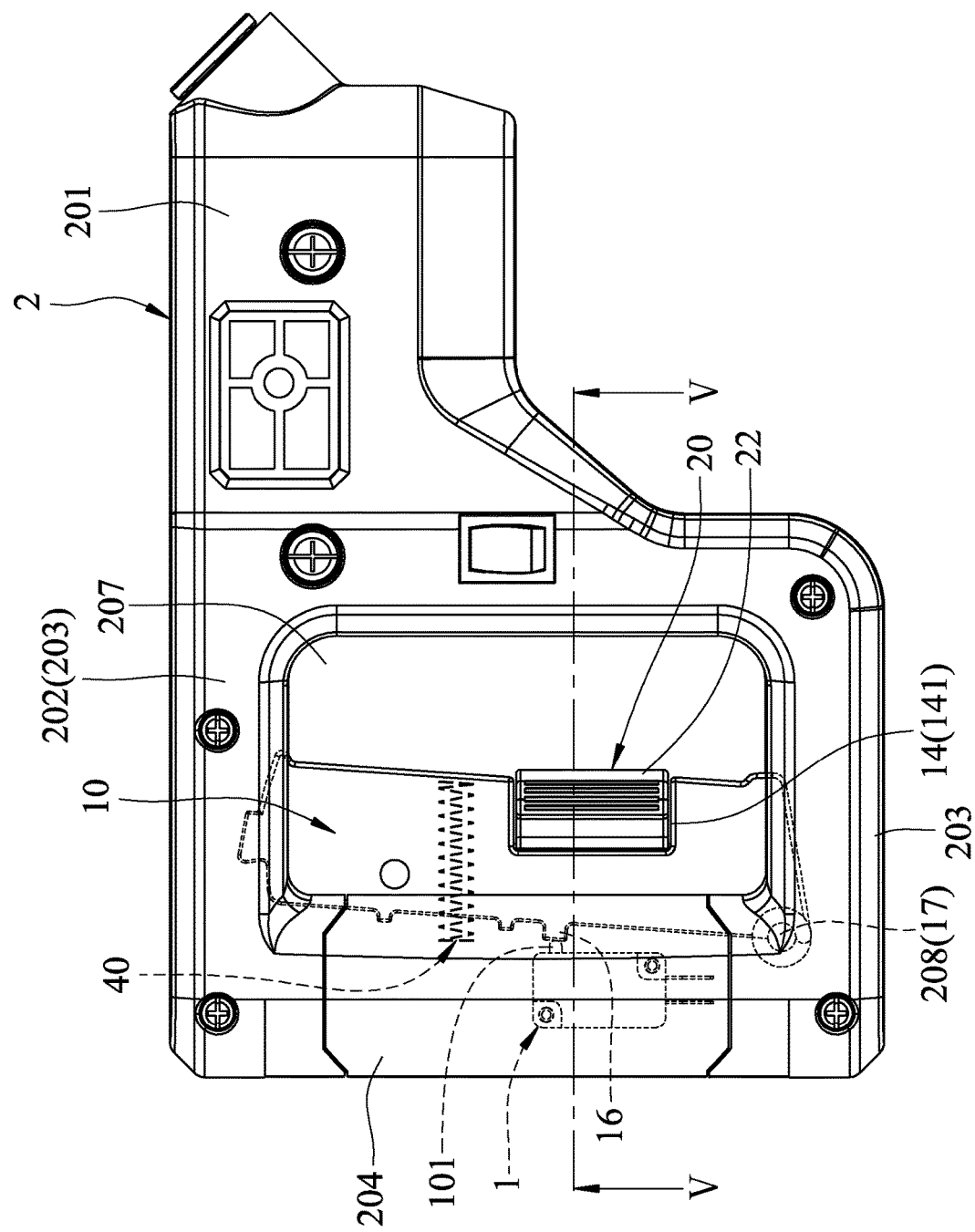
FIG. 4 is a plan view illustrating the arrangement of the safety lock mechanism in the trigger switch incorporated handle in accordance with the present invention.
Figure 7:
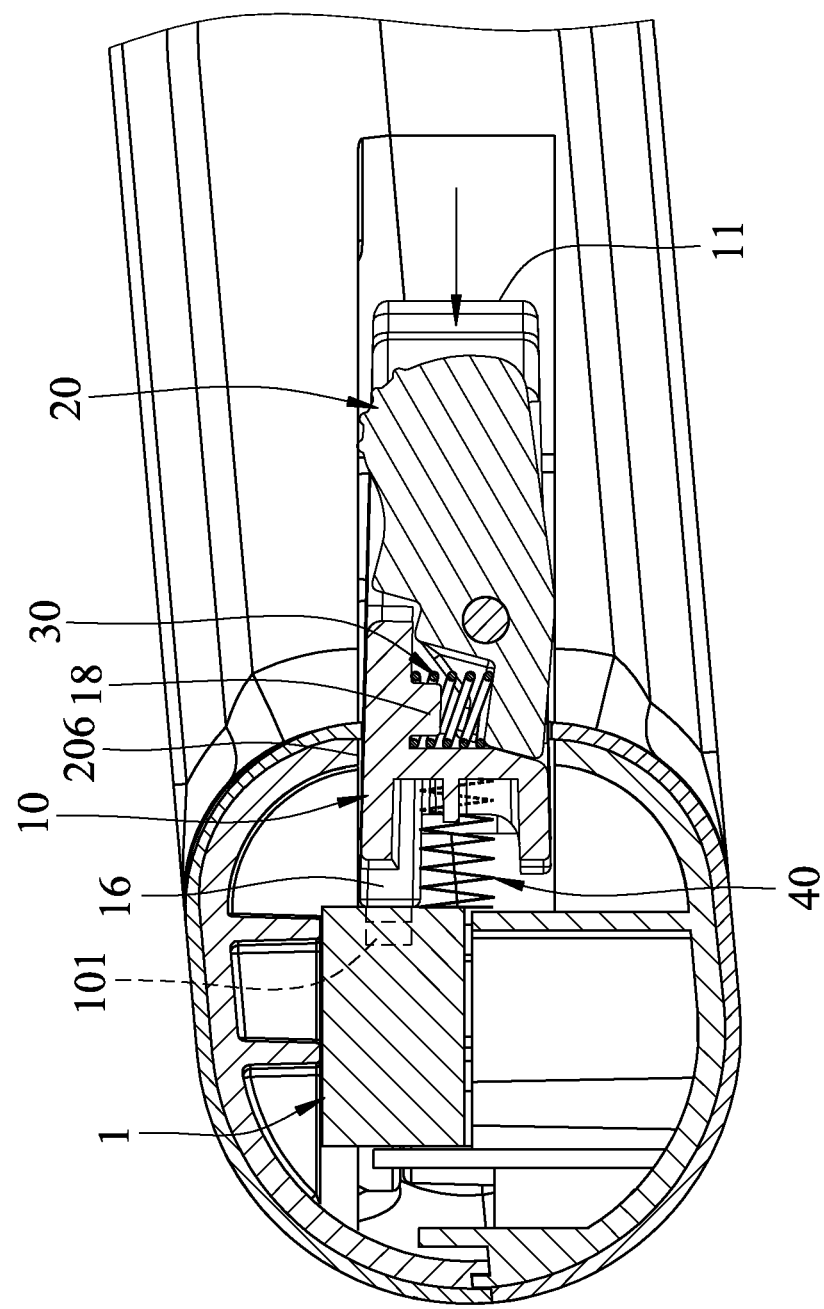
FIG. 7 is another schematic operational view of the present invention, illustrating the safety lock moved in the trigger switch incorporated handle and triggered the switch button.

Referring to FIG. 7 and FIG. 3, when the user presses the top surface 11 of the switch button 10 after the trigger switch handle 2 is released from the constraint of the engaging portion 21, the pivot-connection portion 17 of the switch button 10 is turned about the pivot rod 208 to move the safety lock 20 toward the inside of the sliding groove 206 (at this time, the return spring 40 is compressed to preserve an elastic potential energy) until the trigger block 16 touches the triggering portion 101 of the switch 1 to switch on the power supply of the saw unit.

After the cutting operation, the user releases the switch button 10, enabling the switch button 10 and the safety lock 20 to be biased by the elastic potential energy of the return spring 40 to suspend or position the engaging portion 21 outside the sliding groove 206, where the engaging portion 21 is then forced by the elastic potential energy of the elastic member 30 to move from the unlocking position back to the locking position shown in FIG. 5.

In the present preferred embodiment, the switch 1 can be micro switch, trigger switch or any other equivalent switch means for energizing the saw unit. Further, not only can the safety lock 20 be pivotally connected to the switch button 10, the safety lock 20 can be slidably coupled to the switch button 10 and linearly moved between the locking position to lock the switch button 10 to the trigger switch handle 2 and the unlocking position to unlock the switch button 10 from the trigger switch handle 2 to achieve the same effect.

Thus, the invention has the safety lock 20 mounted to the switch button 10 and, the user must move the safety lock 20 from the locking position to the unlocking position before operation so that the power supply of the saw unit 3 can be switched on for performing a cutting operation, which avoids the risk of operational errors which may cause danger. Further, the overall structure of the safety lock mechanism is simple, facilitating fabrication, installation and safety lock operation. In view of the above, the safety lock mechanism of the present invention solves the technical problems of the prior art designs, and surely achieves the object of the present invention.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A trigger switch handle comprising:
   a safety lock mechanism mounted on the trigger switch handle, the safety lock mechanism comprising:
   a switch button pivotally mounted on the trigger switch handle that is able to be engaged with a switch; and
   a safety lock comprising an engaging portion, the safety lock being connected to the switch button and movable between a locking position where the engaging portion engages the trigger switch handle to lock the switch button to the trigger switch handle, and an unlocking position where the engaging portion is disengaged from the trigger switch handle to allow the switch button to be moved relative to the trigger switch handle to trigger said the switch,
   wherein the switch button and safety lock are configured to be pivotally actuatable about axes that are not parallel to one another.

2. A safety lock mechanism mounted on a trigger switch handle, the safety lock mechanism comprising:
   a switch button pivotally mounted on the trigger switch handle and operable to engage a switch; and
   a safety lock comprising an engaging portion, the safety lock being connected to the switch button and movable between a locking position where the engaging portion engages the trigger switch handle to lock the switch button to the trigger switch handle, and an unlocking position where the engaging portion is disengaged from the trigger switch handle to allow the switch button to be moved relative to the trigger switch handle to trigger the switch, wherein the switch button and safety lock are configured to be pivotally actuatable about axes that are not parallel to one another.

3. The safety lock mechanism of claim 2, wherein the safety lock further comprises a plurality of anti-slip ribs arranged on the operating portion.

4. The safety lock mechanism of claim 2, wherein the safety lock is slidably connected to the switch button and linearly movable relative to the switch button to lock the switch button to the trigger switch handle.

5. The safety lock mechanism of claim 4, further comprising an elastic member mounted between the switch button and the safety lock and adapted to bias the engaging portion toward the locking position.

6. The safety lock mechanism of claim 2, wherein:
the trigger switch handle comprises a sliding groove and an external surface disposed adjacent to and outside of the sliding groove;
the switch is mounted to the trigger switch handle;
the sliding groove accommodates a portion of the switch button and pivoting of the switch button relative to the trigger switch handle;
the engaging portion is positioned to engage the external surface of the trigger switch handle when the safety lock is in the locking position; and
the engaging portion is received into the sliding groove when the switch button is operated to engage the switch and the safety lock is in the unlocking position.

7. The safety lock mechanism of claim 6, further comprising a return spring mounted between the switch button and the trigger switch handle and adapted to bias the engaging portion towards being disposed outside of the sliding groove.

8. The safety lock mechanism as claimed in claim 2, wherein the switch button comprises a top surface, a bottom surface disposed opposite to the top surface to face toward the switch, two opposing lateral surfaces connected between the top surface and the bottom surface, a notch extended from the top surface toward the bottom surface and cut through the lateral surfaces and a pin hole facing toward the notch; the safety lock further comprises an operating portion disposed opposite the engaging portion and mounted in the notch, a pivot hole disposed between the operating portion and the engaging portion and an axle pin inserted through the pivot hole and fastened to the pin hole.

9. The safety lock mechanism as claimed in claim 8, wherein the safety lock further comprises a plurality of anti-slip ribs arranged on the operating portion.

10. The safety lock mechanism of claim 2, wherein the safety lock is pivotally connected to the switch button and biasable relative to the switch button to lock the switch button to the trigger switch handle.

11. The safety lock mechanism of claim 10, further comprising an elastic member mounted between the switch button and the safety lock and adapted to bias the engaging portion toward the locking position.

12. The safety lock mechanism as claimed in claim 10, wherein the switch button comprises a top surface, a bottom surface disposed opposite to the top surface to face toward the switch, two opposing lateral surfaces connected between the top surface and the bottom surface, a notch extended from the top surface toward the bottom surface and cut through the lateral surfaces and a pin hole facing toward the notch; the safety lock further comprises an operating portion disposed opposite to the engaging portion and mounted in the notch, a pivot hole disposed between the operating portion and the engaging portion and an axle pin inserted through the pivot hole and fastened to the pin hole.

13. A trigger switch handle assembly comprising:
a trigger switch handle defining a sliding groove and having an external surface disposed adjacent to and outside of the sliding groove;
a switch mounted to the trigger switch handle;
a switch button pivotally mounted to the trigger switch handle and operable to engage the switch, the sliding groove accommodating a portion of the switch button and pivoting of the switch button relative to the switch handle; and
a safety lock comprising an engaging portion, the safety lock being mounted to the switch button and movable between a locking configuration and an unlocking configuration, the engaging portion being positioned to engage the external surface of the trigger switch handle when the safety lock is in the locking configuration, the engaging portion being received into the sliding groove when the switch button is operated to engage the switch and the safety lock is in the unlocking configuration.

14. A trigger switch handle assembly comprising:
a trigger switch handle defining a sliding groove;
a switch mounted to the trigger switch handle;
a switch button pivotally mounted to the trigger switch handle and operable to engage the switch, the sliding groove accommodating a portion of the switch button and pivoting of the switch button relative to the switch handle; and
a safety lock comprising an engaging portion, the safety lock being mounted to the switch button and movable between a locking configuration and an unlocking configuration, the engaging portion being positioned to engage the trigger switch handle to prevent movement of the switch button into engagement with the switch when the safety lock is in the locking configuration, the engaging portion being received into the sliding groove when the switch button is operated to engage the switch and the safety lock is in the unlocking configuration, the safety lock being retained in the unlocking configuration via engagement with the trigger switch handle when the switch is engaged by the switch button.

15. A safety lock mechanism mounted on a trigger switch handle, the safety lock mechanism comprising:
a switch button pivotally mounted on the trigger switch handle that is able to be engaged with a switch; and
a safety lock comprising an engaging portion, the safety lock being connected to the switch button and movable between a locking position where the engaging portion engages the trigger switch handle to lock the switch button to the trigger switch handle, and an unlocking position where the engaging portion is disengaged from the trigger switch handle to allow the switch button to be moved relative to the trigger switch handle to trigger the switch, wherein the switch button comprises a top surface, a bottom surface disposed opposite to the top surface to face toward the switch, two opposing lateral surfaces connected between the top surface and the bottom surface, a notch extended from the top surface toward the bottom surface and cut through the lateral surfaces and a pin hole facing toward the notch; the safety lock further comprises an operating portion disposed opposite the engaging portion and mounted in the notch, a pivot hole disposed between the operating portion and the engaging portion and an axle pin inserted through the pivot hole and fastened to the pin hole.

16. A safety lock mechanism mounted on a trigger switch handle, the safety lock mechanism comprising:
  a switch button pivotally mounted on the trigger switch handle that is able to be engaged with a switch; and
  a safety lock comprising an engaging portion, the safety lock being connected to the switch button and movable between a locking position where the engaging portion engages the trigger switch handle to lock the switch button to the trigger switch handle, and an unlocking position where the engaging portion is disengaged from the trigger switch handle to allow the switch button to be moved relative to the trigger switch handle to trigger the switch, wherein the safety lock is pivotally connected to the switch button and biasable relative to the switch button to lock the switch button to the trigger switch handle; and wherein the switch button comprises a top surface, a bottom surface disposed opposite to the top surface to face toward the switch, two opposing lateral surfaces connected between the top surface and the bottom surface, a notch extended from the top surface toward the bottom surface and cut through the lateral surfaces and a pin hole facing toward the notch; the safety lock further comprises an operating portion disposed opposite to the engaging portion and mounted in the notch, a pivot hole disposed between the operating portion and the engaging portion and an axle pin inserted through the pivot hole and fastened to the pin hole.

* * * * *